UNITED STATES PATENT OFFICE.

NILS PEDERSEN, OF BORREGAARD VIA SARPSBORG, NORWAY.

PROCESS FOR SEPARATING SOLID PARTICLES FROM SUSPENSION.

1,376,459.     Specification of Letters Patent.     Patented May 3, 1921.

No Drawing.     Application filed September 3, 1918. Serial No. 252,435.

*To all whom it may concern:*

Be it known that I, NILS PEDERSEN, a subject of the King of Norway, of Borregaard via Sarpsborg, Norway, have invented certain new and useful Improvements in Processes for Separating Solid Particles from Suspensions; and I do hereby declare the following to be a full, clear, and exact description of the invention, such as will enable others skilled in the art to which it appertains to make and use the same.

It is well known to separate solid substances from a suspension by means of air bubbles introduced or created in a liquid.

In the usual processes for such separation, for instance the known ore flotation process, the air bubbles are produced either by being introduced below the surface of the liquid by means of an ejector or the like, or by being beaten into the liquid in a mixer at atmospheric pressure and liberated at a lower pressure.

The first named methods possess the disadvantage that it is difficult to obtain sufficiently fine air bubbles, and the last named method has the disadvantage that it is difficult to obtain a sufficient absorption of air into the liquid.

According to the present invention the liquid is caused to absorb air or other gas under pressure, but the liberation of the air or gas thus introduced in the liquid takes place at atmospheric pressure. In this manner it is possible by regulating the pressure during the absorption to determine exactly the quantity of air absorbed in the liquid, said quantity being mainly dependent upon the pressure during the process of absorption.

The air bubbles and the distribution of the same obtained in this manner are infinitely finer than the bubbles obtained according to any other process. The liquid owing to the fine air bubbles acquires a milky color, and the fine air bubbles produced have proved to have a great affinity to the solid particles suspended in the liquid.

For carrying out the process a mixer of any known construction may be used provided the same is adapted to be put under pressure. From the mixer the liquid is conducted to a separating vessel in which the air bubbles are liberated and carry the suspended solid particles with them to the surface.

My invention is particularly applicable to the separation of the fiber from the waste liquor of pulp factories. The high pressure air or other gas, for example, waste gases from the pulp manufacture, is forced by jets into a body of liquid containing the fiber in a closed chamber capable of sustaining the pressure.

The liquor is preferably continuously supplied to and discharged from the chamber during the introduction of the gas or air. It appears that the compressed air or gas displaces some of the liquid absorbed by the fibers and at the same time is absorbed by the liquid in and surrounding the fibers, so that when the liquid and fibers are suddenly relieved from pressure the gas bubbles will surround each fiber along its entire length and rapidly lift it to the surface. These bubbles adhering to the individual fibers will keep the fibers at the surface of the liquid for a considerable time before they coalesce, and break. The rise of the fibers through the liquid is not only assisted by their adhering bubbles, but also by the rising beneath them of a multitude of other bubbles not attached to the fibers.

The speed with which the fibers are caused to rise to the surface of the liquid, as well as the length of time the fibers remain at the surface depends entirely upon the pressure employed, and this I vary, according to circumstances and conditions of operating at the plant where the process is used.

As stated the method above described is particularly adapted for separating wood fibers suspended in the outlet water from various kinds of wood pulp plants, but the process may also be used in connection with the known methods for separation of ore.

I claim:

1. The process of separating fibers from waste liquors of paper mills, which comprises subjecting the liquor to stirring while under pressure and while introducing a gas under pressure and then discharging the liquid and permitting the liberation of the gas.

2. The process of separating fibers from waste liquors of paper mills, which comprises introducing air or gas under a pressure exceeding atmospheric pressure into a body of said liquor in a closed chamber, regulating the pressure during absorption and liberating the mixture at atmospheric pressure.

In testimony that I claim the foregoing as my invention, I have signed my name in presence of two subscribing witnesses.

NILS PEDERSEN.

Witnesses:
C. FABRICIUS HANSEN,
C. NORMAN.